United States Patent
Yoshimura et al.

(10) Patent No.: US 10,256,611 B2
(45) Date of Patent: Apr. 9, 2019

(54) GAS INSULATED ELECTRICAL APPARATUS AND METHOD OF MANUFACTURING GAS INSULATED ELECTRICAL APPARATUS

(71) Applicant: MITSUBISHI ELECTRIC CORPORATION, Chiyoda-ku (JP)

(72) Inventors: Manabu Yoshimura, Chiyoda-ku (JP); Shinichiro Nakauchi, Chiyoda-ku (JP); Hitoshi Sadakuni, Chiyoda-ku (JP); Shuhei Akashi, Chiyoda-ku (JP); Hiroyuki Hama, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/316,759

(22) PCT Filed: Nov. 13, 2014

(86) PCT No.: PCT/JP2014/080029
§ 371 (c)(1),
(2) Date: Dec. 6, 2016

(87) PCT Pub. No.: WO2016/006137
PCT Pub. Date: Jan. 14, 2016

(65) Prior Publication Data
US 2017/0194773 A1    Jul. 6, 2017

(30) Foreign Application Priority Data

Jul. 10, 2014    (JP) .................................. 2014-142166

(51) Int. Cl.
*H02B 5/00*    (2006.01)
*H02B 5/06*    (2006.01)
(Continued)

(52) U.S. Cl.
CPC ................. *H02B 5/06* (2013.01); *H02B 3/00* (2013.01); *H02B 13/035* (2013.01);
(Continued)

(58) Field of Classification Search
None
See application file for complete search history.

(56) References Cited

U.S. PATENT DOCUMENTS

2017/0149226 A1*  5/2017  Nakauchi ............... H02G 5/063
2017/0194775 A1*  7/2017  Kainaga ................. H02B 13/01

FOREIGN PATENT DOCUMENTS

JP    39-10605       6/1964
JP    62-141909 A    6/1987
(Continued)

OTHER PUBLICATIONS

International Search Report dated Dec. 9, 2014, in PCT/JP2014/080029, filed Nov. 13, 2014.
(Continued)

*Primary Examiner* — Courtney L Smith
(74) *Attorney, Agent, or Firm* — Oblon, McClelland, Maier & Neustadt, L.L.P.

(57) ABSTRACT

A gas electrical apparatus includes: a container filled with insulating gas; a high voltage conductor arranged inside the container and applied with a prescribed voltage; and an insulating support member configured to insulate and support the high voltage conductor relative to the container. The high voltage conductor is covered by a first dielectric film. The first dielectric film includes a through hole extending from the first main surface to the second main surface. The through hole has an inner circumferential surface on which a first coating film is formed such that at least a hole
(Continued)

diameter of the through hole is less than a diameter of an electron avalanche in a state where a gas insulated electrical apparatus is used.

10 Claims, 5 Drawing Sheets

(51) Int. Cl.
*H02B 3/00* (2006.01)
*H02B 13/035* (2006.01)
*H02G 5/06* (2006.01)

(52) U.S. Cl.
CPC ............. *H02G 5/061* (2013.01); *H02G 5/063* (2013.01); *H02G 5/068* (2013.01)

(56) References Cited

FOREIGN PATENT DOCUMENTS

| | | |
|---|---|---|
| JP | 2000-125451 A | 4/2000 |
| JP | 2008-271744 A | 11/2008 |
| JP | 2009-999450 A | 5/2009 |
| JP | 2012-210108 A | 10/2012 |
| WO | 2015/198420 A1 | 12/2015 |

OTHER PUBLICATIONS

Extended European Search Report dated Jan. 31, 2018 in Patent Application No. 14897394.4.
Combined Chinese Office Action and Search Report dated Nov. 7, 2017 in Chinese Patent Application No. 201480080461.2, 10 pages (with English translation).

* cited by examiner

GAS INSULATED ELECTRICAL APPARATUS AND METHOD OF MANUFACTURING GAS INSULATED ELECTRICAL APPARATUS

TECHNICAL FIELD

The present invention relates to a gas insulated electrical apparatus and a method of manufacturing the gas insulated electrical apparatus, and particularly to a gas insulated electrical apparatus in which a dielectric film for suppressing electric discharge is formed on a surface of a conductor applied with a high voltage, and a method of manufacturing the gas insulated electrical apparatus.

BACKGROUND ART

A gas insulated switchgear is configured to include a plurality of containers for housing a disconnector, a circuit breaker and the like therein and coupled to each other to form a structured body that is connected to a transmission line. Generally, a conductor member supplied with high electric power is arranged inside the above-described container. In order to suppress the conductor member supplied with high electric power from being unintentionally electrically conductive to other regions (particularly, a container) inside the container, the container is filled with insulating gas (insulating medium) or a conductor member is supported inside the container by an insulating support member (insulating spacer) made of an insulating member. By such a structure, the conductor member of the gas insulated switchgear is protected from the influence of the external world. Accordingly, the gas insulated switchgear is improved in reliability and safety, and also decreased in load to the environment.

Examples of the above-described insulating gas generally used for the gas insulated electrical apparatus may be sulfur hexafluoride gas ($SF_6$ gas), dry air, nitrogen, carbon dioxide gas, carbon fluoride ($CF_4$), iodomethane ($CHI_3$), hexafluoroethane ($C_2F_6$), octafluoropropane ($C_3F_8$), or the like, or mixed gas obtained by combining these gases. Particularly, sulfur hexafluoride gas has dielectric strength about 3 times as much as air. Accordingly, by using sulfur hexafluoride gas as insulating gas in the gas insulated electrical apparatus, the distance between a high voltage portion and a ground electrode can be decreased while maintaining the insulation performance and the interrupting performance. Consequently, the gas insulated electrical apparatus can be reduced in size.

Furthermore, in the gas insulated electrical apparatus, the above-described insulating gas is generally pressurized to atmospheric pressure or more during its use in order to improve the insulation performance and the interrupting performance. Thus, in order to tightly encapsulate the gas and to maintain the equal insulation distance, a high voltage conductor is employed, which is formed in a cylindrical shape and located coaxial with a tank that is similarly formed in a cylindrical shape and that serves as the above-described airtight container.

In the gas insulated electrical apparatus, when the area of the electrode serving as a high electric field portion such as a high voltage conductor is increased, the electrode area effect of reducing a breakdown electric field becomes remarkable. This phenomenon appears particularly remarkably when an electric field portion exhibiting a high electric field of a certain level or higher exists over an electrode area of several 1000 $mm^2$ to several 100000 $mm^2$ or more as in the case of a gas insulated electrical apparatus. In order to raise the withstand voltage while excluding the influence of the electrode area effect, it is a common practice to form a coating film (insulating coating film) having electrical insulation properties against the electrode.

In general, an electrode has a surface provided with projections and depressions of μm order. An insulating coating film is formed on this surface of the electrode, so that field-emitting electrons generated from the top portion of each projected portion can be suppressed while the electric field concentration on the top portion of each projected portion can be alleviated. Consequently, occurrence of electric discharge in the vicinity of the electrode can be suppressed, so that the withstand voltage of the gas insulated electrical apparatus is improved.

Japanese Patent Laying-Open No. 62-141909 (PTD 1) discloses that, by taking advantage of the feature of a high voltage conductor generally made of aluminum, such a high voltage conductor is anodized to form a dielectric film (alumite film), which is used as an insulating coating film.

CITATION LIST

Patent Document

PTD 1: Japanese Patent Laying-Open No. 62-141909

SUMMARY OF INVENTION

Technical Problem

However, the dielectric film formed by such an anodizing treatment is provided with a through hole. Accordingly, the conventional gas insulated electrical apparatus could not suppress emission of electrons from an electrode (high voltage conductor) through the through hole, so that it was difficult to sufficiently suppress electric discharge. Therefore, it was difficult to obtain a gas insulated electrical apparatus with high insulation reliability.

The present invention has been made to solve the above-described problems. A main object of the present invention is to provide a gas insulated electrical apparatus with high insulation reliability.

Solution to Problem

A gas insulated electrical apparatus according to the present invention includes: a container filled with insulating gas; a high voltage conductor arranged inside the container and applied with a prescribed voltage; and an insulating support member configured to insulate and support the high voltage conductor relative to the container. The high voltage conductor is covered by a first dielectric film. The first dielectric film has a first main surface exposed inside the container and a second main surface located on a side opposite to the first main surface and being in contact with the high voltage conductor. The first dielectric film is provided with a through hole extending from the first main surface to the second main surface. The through hole has an inner circumferential surface on which a first coating film is formed such that at least a hole diameter of the through hole is less than a diameter of an electron avalanche in a state where the gas insulated electrical apparatus is used.

Advantageous Effects of Invention

According to the present invention, a gas insulated electrical apparatus with high insulation reliability can be provided.

DESCRIPTION OF EMBODIMENTS

Figure 1:
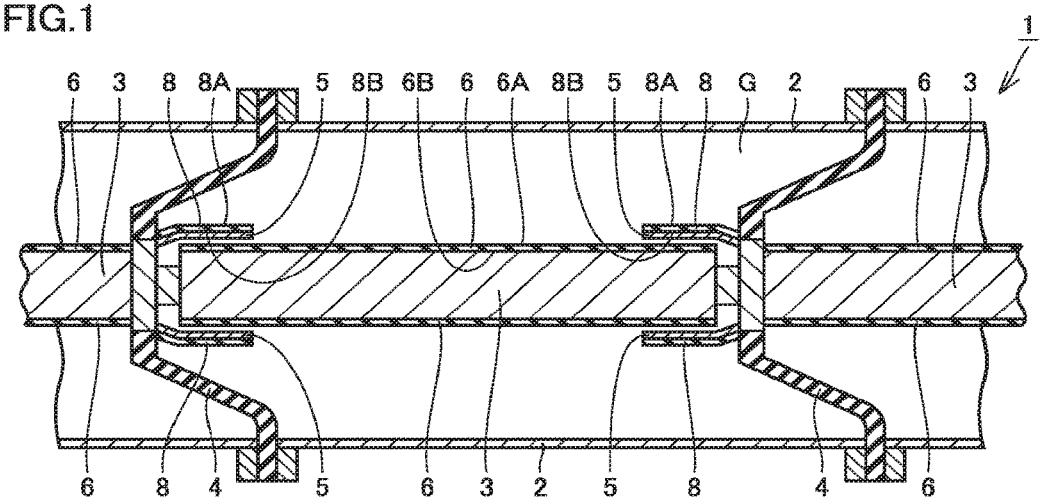
FIG. 1 is a diagram for illustrating a gas insulated electrical apparatus according to the first embodiment.

The embodiments of the present invention will be hereinafter described with reference to the accompanying drawings. In the following description of the embodiments, the same or corresponding components are designated by the same reference characters, and description thereof will not be repeated.

First Embodiment

Figure 2:
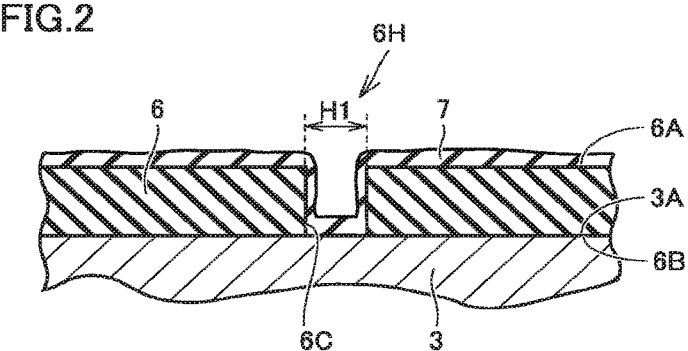
FIG. 2 is a diagram for illustrating the first dielectric film and the first coating film in the gas insulated electrical apparatus according to the first embodiment.

Referring to FIGS. 1 and 2, a gas insulated electrical apparatus 1 according to the first embodiment will be hereinafter described. Gas insulated electrical apparatus 1 according to the first embodiment includes: a container 2 filled with insulating gas G; a high voltage conductor 3 arranged inside container 2 and applied with a prescribed voltage; and an insulating support member 4 configured to insulate and support high voltage conductor 3 relative to container 2.

Gas insulated electrical apparatus 1 shown in FIG. 1 is connected so as to be sandwiched, for example, between a circuit breaker located on the left side in FIG. 1 and a disconnector located on the right side in FIG. 1.

Container 2 may be made of any metal having conductivity. Container 2 is formed in a cylindrical outer shape, grounded, and fixed to a ground potential. Container 2 has joint portions at its both ends in the axial direction. The joint portion of container 2 on the circuit breaker side is connected to a joint portion of a metal container of the circuit breaker with insulating support member 4 interposed therebetween. The joint portion of container 2 on the disconnector side is connected to a joint portion of a metal container of the disconnector with another insulating support member 4 interposed therebetween.

High voltage conductor 3 is electrically connected to component devices such as a circuit breaker (not shown) and a disconnector (not shown) that are arranged inside gas insulated electrical apparatus 1. High voltage conductor 3 may be made of any material having conductivity, which may be aluminum (Al) or an aluminum alloy, for example.

High voltage conductor 3 is arranged to be coaxial with container 2. Specifically, high voltage conductor 3 is provided in an approximately cylindrical shape so as to extend along the central axis of container 2. High voltage conductor 3 is positioned by insulating support member 4.

At each of both ends of high voltage conductor 3 in the axial direction, a coupling portion supported by insulating support member 4 is formed. The coupling portion of high voltage conductor 3 and a portion located in the vicinity thereof are surrounded by an electric field relaxing shield 5. The coupling portion of high voltage conductor 3 on the circuit breaker side is coupled to a coupling portion for high voltage conductor 3 provided in the circuit breaker. The coupling portion of high voltage conductor 3 on the disconnector side is coupled to a coupling portion for high voltage conductor 3 provided in the disconnector. A first dielectric film 6 is formed on a surface 3A (see FIG. 2) of high voltage conductor 3 located between the coupling portion of high voltage conductor 3 on the circuit breaker side and the coupling portion of high voltage conductor 3 on the disconnector side. In this case, electric field relaxing shield 5 is formed so as to face first dielectric film 6 formed on surface 3A at a prescribed distance.

Insulating support member 4 has a projected surface on one side and a depressed surface on the other side in the extending direction of high voltage conductor 3. Furthermore, insulating support member 4 has a flat portion at its end in the radial direction. Insulating support member 4 also has an opening in the center portion.

The flat portion of insulating support member 4 is sandwiched between the joint portion of container 2 and the joint portion of the metal container of the circuit breaker or the joint portion of the metal container of the disconnector. Thereby, insulating support member 4 is fixed to container 2. Insulating support member 4 may be made of any insulating material.

The opening of insulating support member 4 fits in the coupling portion of high voltage conductor 3. Thereby, insulating support member 4 supports high voltage conductor 3. The opening of insulating support member 4 is tightly sealed by high voltage conductor 3. Insulating gas G is enclosed in a space surrounded by container 2, insulating support member 4 and high voltage conductor 3.

Insulating gas G may be any insulating gas, which for example may be one selected from sulfur hexafluoride gas ($SF_6$ gas), dry air, nitrogen, carbon dioxide gas, carbon fluoride ($CF_4$), iodomethane ($CHI_3$), hexafluoroethane ($C_2F_6$), octafluoropropane ($C_3F_8$), or the like, or mixed gas obtained by combining these gases.

Electric field relaxing shield 5 may be made of any material having conductivity, which may be Al or an aluminum alloy, for example. A second dielectric film 8 is formed on a surface of electric field relaxing shield 5 that is located on the side opposite to the surface that faces high voltage conductor 3.

The following is an explanation about first dielectric film 6, a first coating film 7 (see FIG. 2) formed on first dielectric film 6, second dielectric film 8, and a second coating film 9 (see FIG. 3) formed on second dielectric film 8.

As described above, first dielectric film 6 is formed so as to cover surface 3A of high voltage conductor 3. First dielectric film 6 may be made of any material having electrical insulation property, which may be aluminum oxide, for example. Specifically, first dielectric film 6 is made of alumite formed by anodizing high voltage conductor 3, for example, made of aluminum.

First dielectric film 6 includes a first main surface 6A exposed inside container 2 and a second main surface 6B located on the side opposite to first main surface 6A and being in contact with high voltage conductor 3. First dielectric film 6 is provided with a plurality of first through holes 6H each extending from first main surface 6A to second main surface 6B. First through holes 6H adjacent to each other among the plurality of first through holes 6H are provided at a prescribed distance from each other.

First through hole 6H has an inner circumferential surface 6C that is formed so as to have opposed planes that face each other with an internal space of first through hole 6H interposed therebetween. In this case, a maximum distance H1 (see FIG. 2) between the opposed planes of inner circumferential surface 6C is approximately 10 nm or more and several 100 nm or less in the case where first dielectric film 6 is made of alumite. First through hole 6H is formed, for example, so as to have a hexagonal plane shape in first main surface 6A and also to have inner circumferential surface 6C extending in the direction perpendicular to first main surface 6A and second main surface 6B.

First coating film 7 is formed on inner circumferential surface 6C of first through hole 6H and on surface 3A of high voltage conductor 3 that is exposed inside first through hole 6H. First coating film 7 may be formed so as to cover first main surface 6A and inner circumferential surface 6C of first through hole 6H. First coating film 7 may be made of any material having electrical insulation property, which may be a hydrate of aluminum oxide, for example. Specifically, first coating film 7 is made of a hydrate of aluminum oxide formed by performing an optional sealing treatment for first dielectric film 6 made of alumite. First coating film 7 is less in thickness, for example, than first dielectric film 6.

Similarly, electric field relaxing shield 5 has a surface that is located on the side opposite to the surface facing high voltage conductor 3 and that is covered by second dielectric film 8. Second dielectric film 8 has the same configuration as that of first dielectric film 6. In other words, second dielectric film 8 may be made of any material having electrical insulation property, which may be aluminum oxide, for example. Specifically, second dielectric film 8 is, for example, made of alumite formed by anodizing electric field relaxing shield 5 made of aluminum.

Second dielectric film 8 includes: a third main surface 8A exposed inside container 2; and a fourth main surface 8B located on the side opposite to third main surface 8A and being in contact with electric field relaxing shield 5. Second dielectric film 8 is provided with a second through hole 8H extending from third main surface 8A to fourth main surface 8B.

Figure 3:
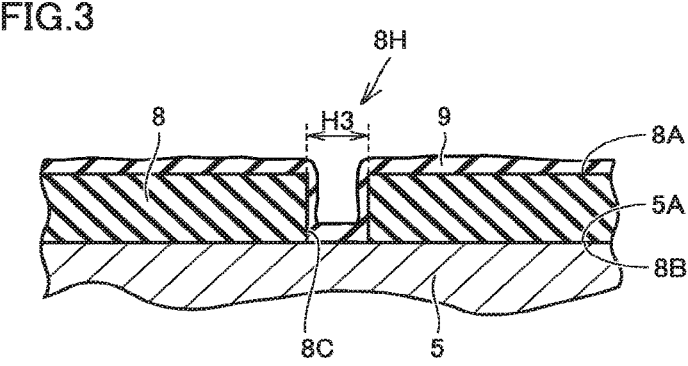
FIG. 3 is a diagram for illustrating the second dielectric film and the second coating film in the gas insulated electrical apparatus according to the first embodiment.

Referring to FIG. 3, second through hole 8H has an inner circumferential surface 8C that is formed so as to have opposed planes that face each other with an internal space of second through hole 8H interposed therebetween. In this case, a maximum distance H3 (see FIG. 3) between the opposed planes of inner circumferential surface 8C is approximately several 10 nm or more and several 100 nm or less in the case where second dielectric film 8 is made of alumite. Second through hole 8H is formed, for example, so as to have a hexagonal plane shape in third main surface 8A and also to have inner circumferential surface 8C extending in the direction perpendicular to third main surface 8A and fourth main surface 8B.

Second coating film 9 is formed on inner circumferential surface 8C of second through hole 8H and on a surface 5A of electric field relaxing shield 5 that is exposed inside second through hole 8H. Second coating film 9 may be formed so as to cover third main surface 8A and inner circumferential surface 8C of second through hole 8H. Second coating film 9 may be made of any material having electrical insulation property, which may be a hydrate of aluminum oxide, for example. Specifically, second coating film 9 is made of a hydrate of aluminum oxide formed by performing an optional sealing treatment for second dielectric film 9 made of alumite. Second coating film 9 is less in thickness, for example, than second dielectric film 8.

Figure 5:
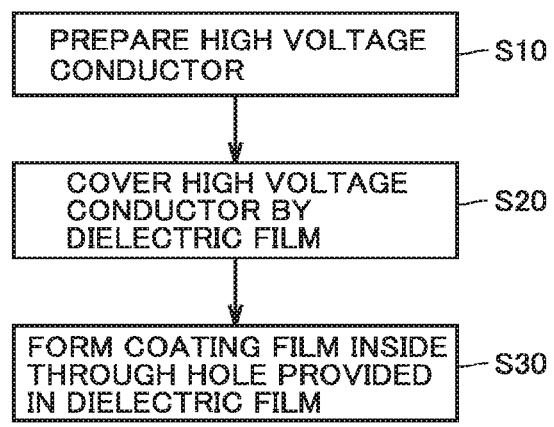
FIG. 5 is a flowchart for illustrating a method of manufacturing the gas insulated electrical apparatus according to the first embodiment.

Then, referring to FIG. 5, a method of manufacturing gas insulated electrical apparatus 1 according to the first embodiment will be hereinafter described.

In the method of manufacturing gas insulated electrical apparatus 1 according to the first embodiment, high voltage conductor 3 and the like are first prepared (step (S10)). Specifically, the following are prepared: a container 2 filled with insulating gas; a high voltage conductor 3 arranged inside container 2 and applied with a prescribed voltage; an insulating support member 4 configured to insulate and support high voltage conductor 3 relative to container 2; and an electric field relaxing shield 5.

Then, high voltage conductor 3 is covered by first dielectric film 6 (step (S20)). The method of covering high voltage conductor 3 by first dielectric film 6 may be any method. For example, first dielectric film 6 made of alumite is formed by anodizing high voltage conductor 3 made of Al. This anodizing treatment may be performed by energizing an anode and a cathode, in which case the anode is obtained by immersing high voltage conductor 3 in a liquid electrolyte such as a sulfuric acid aqueous solution, a phosphoric acid aqueous solution or a chromic acid aqueous solution, and an oxalic acid aqueous solution, while the cathode is obtained by immersing other electrode in this liquid electrolyte. Thereby, the surface of high voltage conductor 3 is oxidized by oxygen produced in the liquid electrolyte, thereby forming alumite. In addition, first dielectric film 6 made of alumite is formed in a region located on the inner side of high voltage conductor 3 relative to the original surface of high voltage conductor 3 and also formed in a region located on the outer side of high voltage conductor 3 relative to the original surface thereof. In other words, surface 3A of high voltage conductor 3 on which first dielectric film 6 has been formed is formed on the inner side of high voltage conductor 3 relative to the original surface of high voltage conductor 3 (the surface before first dielectric film 6 is formed thereon).

Similarly, electric field relaxing shield 5 is covered by second dielectric film 8. The method of covering electric field relaxing shield 5 by second dielectric film 8 may be any method, which may be performed similarly to the method of covering high voltage conductor 3 by first dielectric film 6. Also, for example, the above-described anodizing treatment may be employed. In this case, an optional treatment is applied to a surface of electric field relaxing shield 5 that faces high voltage conductor 3 for preventing oxygen from being supplied to this surface. Thereby, second dielectric film 8 can be formed only on the surface located on the side opposite to the surface that faces high voltage conductor 3.

In this way, high voltage conductor 3 can be covered by first dielectric film 6, and also, electric field relaxing shield 5 can be covered by second dielectric film 8. In this case, a plurality of first through holes 6H are provided at prescribed intervals in first dielectric film 6. Also, a plurality of second through holes 8H are provided at prescribed intervals in second dielectric film 8.

Then, first coating film 7 is formed inside first through hole 6H provided in first dielectric film 6 (step (S30)). Specifically, first dielectric film 6 is subjected to a sealing treatment, thereby forming first coating film 7 on inner circumferential surface 6C of first through hole 6H formed in first dielectric film 6 and also on surface 3A of high voltage conductor 3 that is exposed inside first through hole 6H. The method of forming first coating film 7 may be any sealing method. In this case, for example, steam pressurized to a prescribed pressure is supplied for a prescribed time period to high voltage conductor 3 and first dielectric film 6 that are arranged inside the pressure container. Thereby, pressurized steam is supplied to the inside of first through hole 6H and onto first main surface 6A of first dielectric film 6. Consequently, first coating film 7 made of an aluminum oxide hydrate can be formed on inner circumferential surface 6C of first through hole 6H, on surface 3A of high voltage conductor 3 that is exposed inside first through hole 6H, and on first main surface 6A. The pressure of the steam supplied at this time is, for example, about 2 atm or more and about 5 atm or less.

In addition, the method of forming first coating film 7 is not limited to a sealing treatment by using pressurized steam, but first coating film 7 may be formed, for example, by immersing high voltage conductor 3 and first dielectric film 6 in boiling water for a prescribed time period. Alternatively, first coating film 7 may be formed, for example, by immersing high voltage conductor 3 and first dielectric film 6 in a nickel sulfate aqueous solution, a nickel acetate aqueous solution, or a nickel fluoride aqueous solution for a prescribed time period. The solution used when forming first coating film 7 may be an aqueous solution that forms acetate, for example, with at least one selected from the group consisting of zinc, manganese, cobalt, chromium, calcium, magnesium, barium, lithium, cerium, and zirconium. Other than acetate, the solution used when forming first coating film 7 may be, for example, an aqueous solution that forms trivalent chromate, cerium salt, yttrium salt, lithium salt, or the like.

Similarly, second coating film 9 is formed inside second through hole 8H provided in second dielectric film 8. Specifically, electric field relaxing shield 5 and second dielectric film 8 are subjected to the above-described sealing treatment, so that second coating film 9 can be formed on an inner circumferential surface 8C of second through hole 8H formed in second dielectric film 8 and on surface 5A of electric field relaxing shield 5 that is exposed inside second through hole 8H, as shown in FIG. 3.

Then, the functions and effects of gas insulated electrical apparatus 1 according to the first embodiment will be hereinafter described. In gas insulated electrical apparatus 1 according to the first embodiment, first through hole 6H in first dielectric film 6 formed so as to cover high voltage conductor 3 is sealed by first coating film 7. From the different point of view, in gas insulated electrical apparatus 1 according to the first embodiment, surface 3A of high voltage conductor 3 is covered by first dielectric film 6 or first coating film 7. Accordingly, also when a high voltage is applied to high voltage conductor 3 in the state where gas insulated electrical apparatus 1 is used, emission of electrons from surface 3A of high voltage conductor 3 can be prevented by first dielectric film 6 or first coating film 7 over the entire surface 3A. Thus, the electrons emitted from high voltage conductor 3 can be prevented from being accelerated by the electric field formed around high voltage conductor 3 by a current flowing through high voltage conductor 3, thereby preventing occurrence of an electron avalanche. Therefore, in such gas insulated electrical apparatus 1, electric discharge is sufficiently suppressed, so that high insulation reliability is achieved.

Namely, in gas insulated electrical apparatus 1 according to the first embodiment, even in the case where first dielectric film 6 provided with first through hole 6H is formed on surface 3A of high voltage conductor 3 and also case where surface 3A is exposed inside first through hole 6H, first through hole 6H is covered by first coating film 7, so that surface 3A of high voltage conductor 3 is prevented from being exposed inside container 2 and coming into contact with insulating gas G. Thereby, it becomes possible to suppress occurrence of electric discharge resulting from emission of electrons from surface 3A of high voltage conductor 3.

Figure 4:
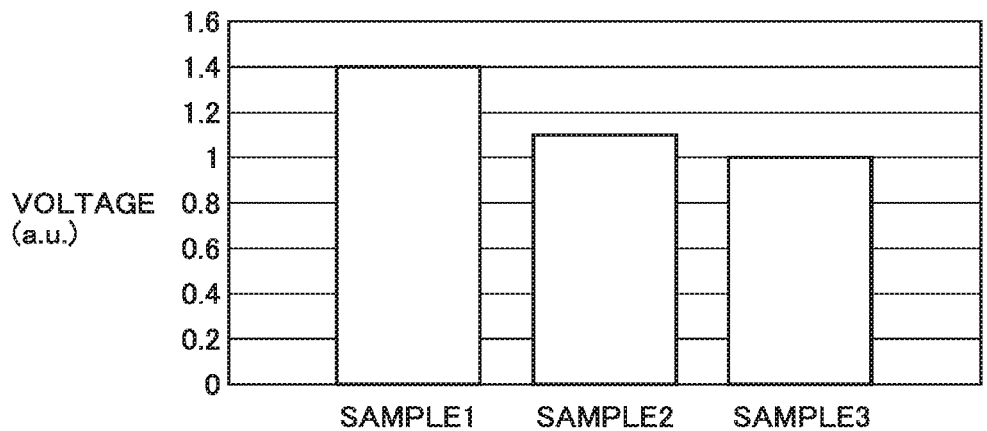
FIG. 4 is a graph showing a dielectric breakdown voltage of the gas insulated electrical apparatus according to the first embodiment and a dielectric breakdown voltage of a conventional gas insulated electrical apparatus.

FIG. 4 shows the magnitude relation between dielectric breakdown voltages of gas insulated electrical apparatus 1 according to the first embodiment and the conventional gas insulated electrical apparatuses, that is, a voltage produced when dielectric breakdown occurs in a gas insulated electrical apparatus by applying a voltage to a high voltage conductor. In FIG. 4, a sample 1 is gas insulated electrical apparatus 1 according to the first embodiment, a sample 2 is a conventional gas insulated electrical apparatus including a high voltage conductor covered by alumite, and a sample 3 is a conventional gas insulated electrical apparatus including a high voltage conductor not covered by alumite. The vertical axis in FIG. 4 shows the ratio of the breakdown voltage relative to the breakdown voltage of sample 3 defined as 1. As shown in FIG. 4, it was confirmed that the breakdown voltage of sample 1 can be raised to 1.4 times as high as the breakdown voltage of sample 3. It was also confirmed that the breakdown voltage of sample 2 was increased to about 1.15 times as high as the breakdown voltage of sample 3 since the high voltage conductor is covered by alumite, but this breakdown voltage of sample 2 was lower than that of sample 1. In other words, it could be confirmed that gas insulated electrical apparatus 1 according to the first embodiment is higher in dielectric breakdown voltage than the conventional gas insulated electrical apparatus, and remarkably improved in withstand voltage performance.

In addition, a thin film referred to as a barrier layer may be formed in a through hole at the stage of the anodization treatment. This thin film has a thickness of several Å level, which cannot completely suppress emission of metal electrons from high voltage conductor 3. Accordingly, the functions and effects of the withstand voltage are exhibited by a sealing treatment as in the case where a complete through hole is provided.

Second Embodiment

Gas insulated electrical apparatus 1 according to the second embodiment has a configuration basically similar to that of gas insulated electrical apparatus 1 according to the first embodiment, but is different therefrom in that first coating film 7 is formed on inner circumferential surface 6C of first through hole 6H such that a hole diameter H2 of first through hole 6H is less than a diameter W of the electron avalanche in the state where gas insulated electrical apparatus 1 is used, that is, different therefrom in that first coating film 7 is not formed so as to cover surface 3A of high voltage conductor 3 inside first through hole 6H of first dielectric film 6. Also, in the specification and the like of the present application, the hole diameter of the through hole means the maximum width of the internal space of the through hole that is connected to the space on the outside of the through hole in the direction perpendicular to the hole axis direction of the through hole. Thus, when first coating film 7 is formed on inner circumferential surface 6C, the hole diameter of the through hole means a distance between which opposed planes of first coating film 7 face each other with this internal space interposed therebetween. In the conventional gas insulated electrical apparatus in which first coating film 7 is not formed, the hole diameter of the through hole means a distance between which opposed planes of the inner circumferential surface face each other with this space interposed therebetween.

Figure 6:
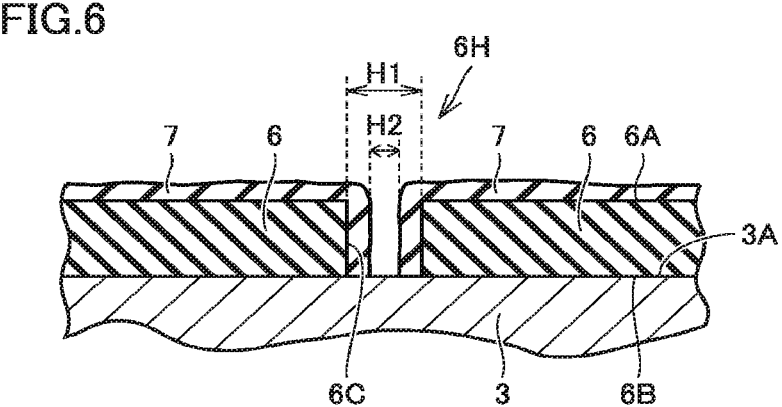
FIG. 6 is a diagram for illustrating the first dielectric film and the first coating film in a gas insulated electrical apparatus according to the second embodiment.
Figure 7:
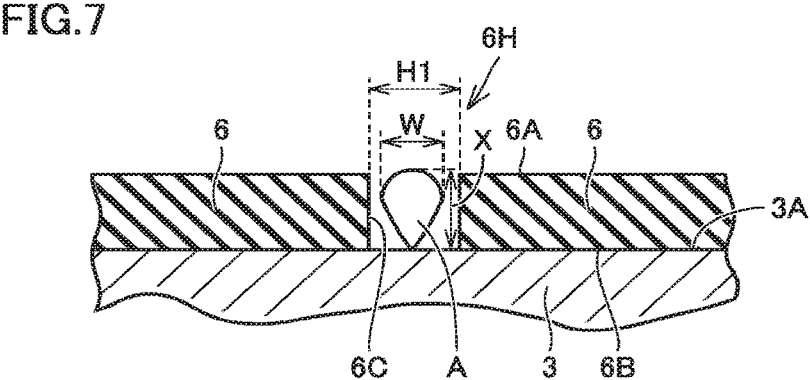
FIG. 7 is a diagram for illustrating an alumite film as an insulating coating film in the conventional gas insulated electrical apparatus.

Referring to FIGS. 6 and 7, the internal space faced by first coating film 7 and high voltage conductor 3 inside first through hole 6H is connected to the space located inside container 2 and filled with insulating gas G. In the present specification, a distance H2 (see FIG. 6) between which opposed planes of first coating film 7 formed on inner circumferential surface 6C face each other with the internal space interposed therebetween is referred to as a hole diameter of first through hole 6H and this distance H2 is defined as an indicator showing the width of the internal space in the direction along surface 3A of high voltage conductor 3 (or first main surface 6A).

First coating film 7 is formed on inner circumferential surface 6C of first through hole 6H such that at least hole diameter H2 of first through hole 6H is equal to or less than diameter W (see FIG. 7) of the electron avalanche in the state where gas insulated electrical apparatus 1 is used. In other words, the width of the internal space in first through hole 6H is set to be equal to or less than diameter W of the electron avalanche that may occur in the state where gas insulated electrical apparatus 1 is used. In addition, the relation between hole diameter H2 of first through hole 6H and diameter W of the electron avalanche will be described later in detail.

Figure 8:
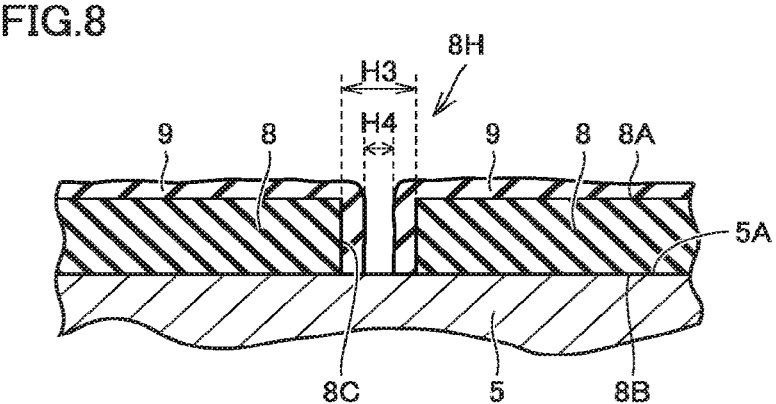
FIG. 8 is a diagram for illustrating the second dielectric film and the second coating film in the gas insulated electrical apparatus according to the second embodiment.

Referring to FIG. 8, the internal space faced by second coating film 9 inside second through hole 8H is connected to the space filled with insulating gas G inside container 2. In the present specification, a distance H4 (see FIG. 8) between which opposed planes of second coating film 9 formed on inner circumferential surface 8C face each other with the internal space interposed therebetween is referred to as a hole diameter of second through hole 8H and this distance H4 is defined as an indicator showing the width of the internal space in the direction along the surface of electric field relaxing shield 5.

Second coating film 9 is formed on inner circumferential surface 8C of second through hole 8H such that at least hole diameter H4 of second through hole 8H is equal to or less than diameter W (see FIG. 7) of the electron avalanche in the state where gas insulated electrical apparatus 1 is used. In other words, the width of the internal space in second through hole 8H is set so as to be equal to or less than diameter W of the electron avalanche that may occur in the state where gas insulated electrical apparatus 1 is used. In addition, the relation between hole diameter H4 of second through hole 8H and diameter W of the electron avalanche will be described later in detail.

In this case, first coating film 7 is formed on inner circumferential surface 6C of first through hole 6H such that at least hole diameter H2 of first through hole 6H is equal to or less than diameter W of the electron avalanche, as described above. Furthermore, second coating film 9 is formed on inner circumferential surface 8C of second through hole 8H such that at least hole diameter H4 of second through hole 8H is equal to or less than diameter W of the electron avalanche, as described above. First dielectric film 6 is formed to have a thickness such that first main surface 6A of first dielectric film 6 is located on the outer side of high voltage conductor 3 relative to surface 3A of high voltage conductor 3, and may be formed to has any thickness as long as emission of electrons from surface 3A into container 2 can be prevented.

Then, a method of manufacturing a gas insulated electrical apparatus according to the second embodiment will be hereinafter described. The method of manufacturing a gas insulated electrical apparatus according to the second embodiment is basically similar in configuration to the method of manufacturing a gas insulated electrical apparatus according to the first embodiment, but allows reduction of the conditions applied when first coating film 7 and second coating film 9 are formed, for example, reduction of the time period during which pressurized steam is supplied to high voltage conductor 3 or electric field relaxing shield 5. Alternatively, it becomes possible to reduce the immersion time period during which high voltage conductor 3 or electric field relaxing shield 5 is immersed in boiling water. Also in this way, gas insulated electrical apparatus 1 according to the second embodiment capable of sufficiently suppressing electric discharge can be achieved.

The following is an explanation about the relation between hole diameter H2 of first through hole 6H and diameter W of the electron avalanche in gas insulated electrical apparatus 1 according to the second embodiment, and also the relation between hole diameter H4 of second through hole 8H and diameter W of the electron avalanche. In this case, diameter W of the electron avalanche corresponds to a diameter of the electron avalanche obtained when the electron avalanche reaches a streamer transition condition (the condition at which the number of electrons reaches a prescribed number, for example, $10^8$ or more), and can be calculated by the following equation.

$$\text{Diameter } W \text{ of Electron Avalanche} = \sqrt{\frac{4 \times \text{Diffusion Coefficient } De \times \text{Progressing Distance } X}{\text{Electron Velocity } Ve}} \quad \text{[Equation 1]}$$

A diffusion coefficient De is an electron diffusion coefficient, an electron velocity Ve is an electron drift velocity, and a progressing distance X is a distance of the electron avalanche obtained when the streamer transition condition is satisfied. During a time period in which the electric field acts after formation of an electron avalanche, the electron avalanche grows until the streamer transition condition is satisfied. Accordingly, progressing distance X corresponds to a distance of the electron avalanche that has grown until the streamer transition condition is satisfied. Progressing distance X varies depending on the atmosphere in which the electron avalanche is formed, and is for example about 10 µm in the atmospheric air. However, progressing distance X is shorter in the $CO_2$ atmosphere than in the atmospheric air. Also in the pressurized $SF_6$ gas atmosphere, progressing distance X is further shortened to 100 nm or less. In other words, the progressing distance in the pressurized $SF_6$ gas atmosphere is equal to or less than the level equivalent to the hole diameter of the through hole provided in alumite (in this case, the distance between the opposed planes of the inner circumferential surface: several 10 nm or more and several 100 nm or less). In this case, the electron avalanche can grow until it reaches the streamer transition condition without coming in contact with the side wall of the through hole. In other words, the electron avalanche can grow until the number of electrons reaches a prescribed number, for example, $10^8$, inside the through hole. Thereby, the electron avalanche transitions to a streamer, thereby causing a dielectric breakdown. Thus, it becomes difficult to suppress electric discharge resulting from the electron avalanche inside the through hole.

In contrast, according to gas insulated electrical apparatus 1 of the second embodiment, even if maximum distance H1 between the opposed planes of inner circumferential surface 6C in first through hole 6H and maximum distance H3 between the opposed planes of inner circumferential surface 8C in second through hole 8H are longer than the diameter of the electron avalanche in the insulating gas G atmosphere inside container 2, an electron avalanche can be prevented from growing until this electron avalanche transitions to a streamer, so that electric discharge can be sufficiently prevented. Specifically, in the second embodiment, first coating film 7 is formed on inner circumferential surface 6C such that hole diameter H2 of first through hole 6H is smaller than diameter W of the electron avalanche. Also, second coating film 9 is formed on inner circumferential surface 8C such that hole diameter H3 of second through hole 8H is smaller than diameter W of the electron avalanche. In this way, electrons may be emitted from high voltage conductor 3 exposed inside first through hole 6H and electric field relaxing shield 5 exposed inside second through hole 8H toward the space inside container 2 filled with insulating gas G. However, even if these electrons are accelerated by the electric field formed by high voltage conductor 3 or electric field relaxing shield 5 to thereby cause an electron avalanche, first coating film 7 and second coating film 9 can prevent the electron avalanche from growing until this electron avalanche reaches the streamer transition condition.

Figure 9:
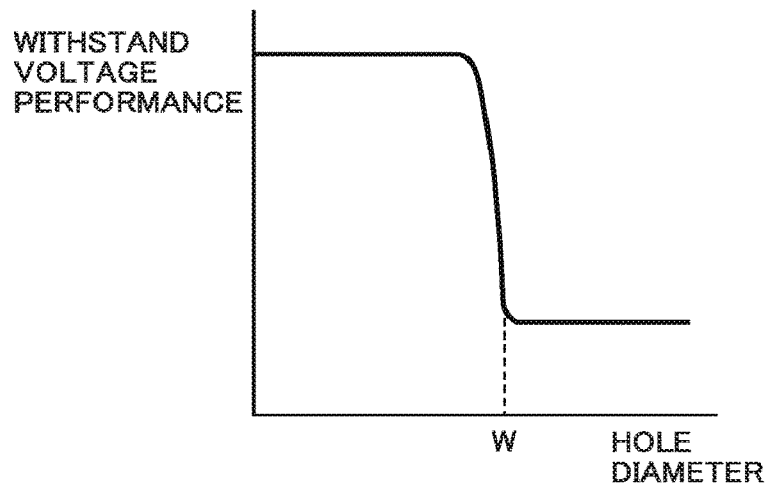
FIG. 9 is a graph showing the withstand voltage performance for a hole diameter of a through hole in the gas insulated electrical apparatus.

FIG. 9 shows a withstand voltage performance of gas insulated electrical apparatus 1. The vertical axis shows a withstand voltage performance while the horizontal axis shows hole diameter H2 of first through hole 6H. When hole diameter H2 of first through hole 6H is less than diameter W of the electron avalanche, the growth of the electron avalanche is suppressed by first coating film 7 formed inside first through hole 6H. Accordingly, a high withstand voltage performance is exhibited irrespective of maximum distance H1 between the opposed planes of inner circumferential surface 6C in first through hole 6H. In contrast, when first coating film 7 is not formed, or when hole diameter H2 of first through hole 6H is equal to or greater than diameter W of the electron avalanche, the electron avalanche grows while repeating ionization by collision with neutral molecules without being blocked by inner circumferential surface 6C and first coating film 7. Then, this electron avalanche transitions to a streamer.

In other words, the electron avalanche that may occur inside first through hole 6H or second through hole 8H in gas insulated electrical apparatus 1 according to the second embodiment is to come in contact with first coating film 7 and second coating film 9 before the streamer transition condition is satisfied, with the result that growth of the electron avalanche is inhibited. Consequently, transition of the electron avalanche to a streamer is suppressed. Thus, in gas insulated electrical apparatus 1 according to the second embodiment, even if an electron avalanche occurs, occurrence of electric discharge resulting from this electron avalanche is sufficiently suppressed. Accordingly, this gas insulated electrical apparatus 1 according to the second embodiment is remarkably improved in withstand voltage performance as compared with the conventional gas insulated electrical apparatus.

In addition, in the above-described first embodiment, when first through hole 6H is sealed by first coating film 7, that is, when first coating film 7 is formed at least on surface 3A, distance H2 (see FIG. 6) may be greater than diameter W (see FIG. 7) of the electron avalanche. This distance H2 corresponds to a distance between which the opposed planes of first coating film 7 formed on inner circumferential surface 6C face each other with the internal space interposed therebetween. Similarly, when second through hole 8H is sealed by second coating film 9, that is, when second coating film 9 is formed at least on surface 5A, distance H4 (see FIG. 8) may be greater than diameter W (see FIG. 7) of the electron avalanche. This distance H4 corresponds to a distance between which the opposed planes of coating film 9 formed on inner circumferential surface 8C face each other with the internal space interposed therebetween.

Third Embodiment

Figure 10:
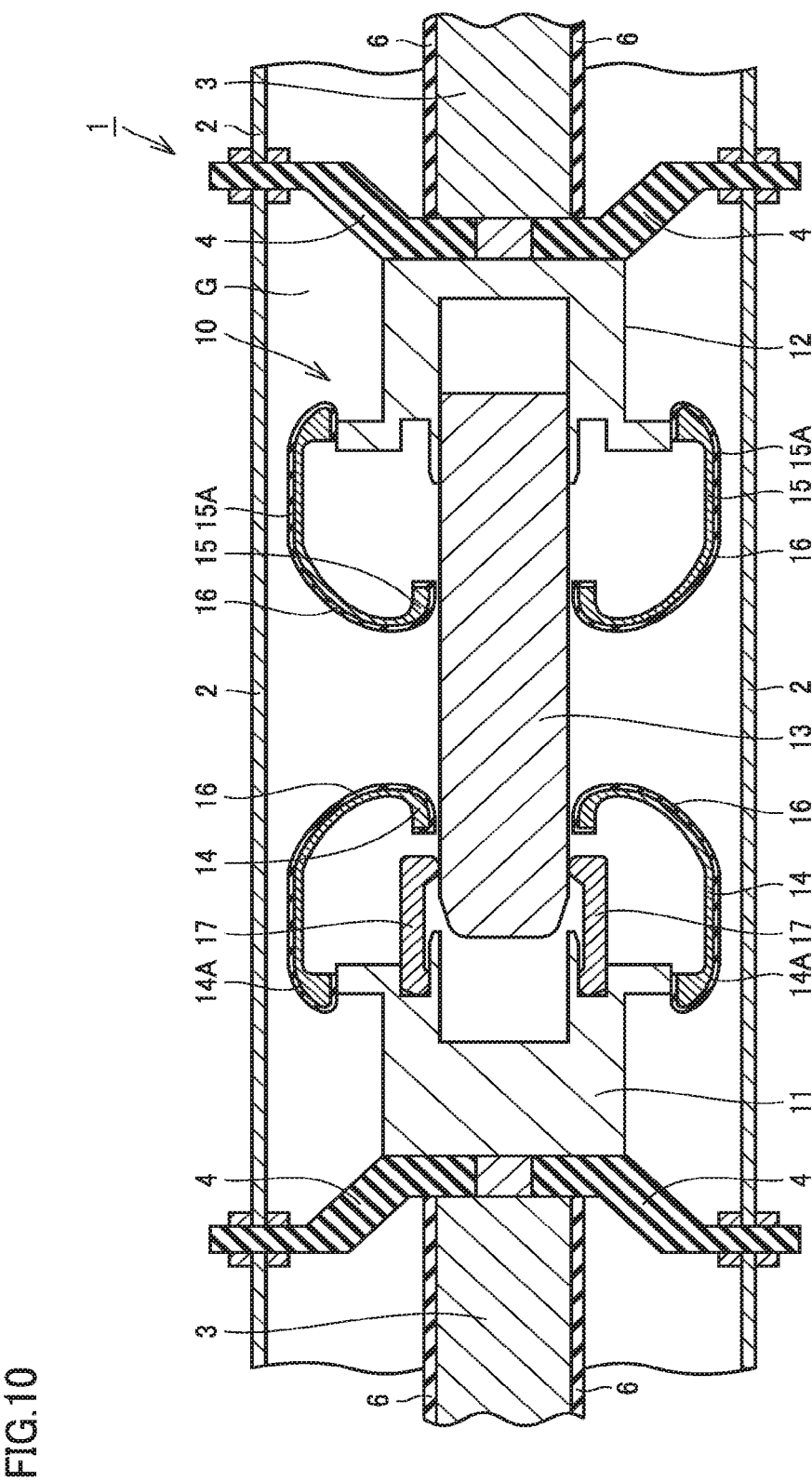
FIG. 10 is a diagram for illustrating a gas insulated electrical apparatus according to the third embodiment.
Figure 11:
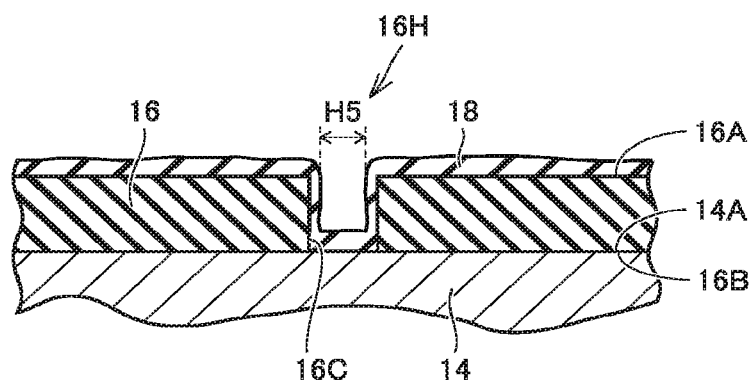
FIG. 11 is a diagram for illustrating the gas insulated electrical apparatus according to the third embodiment.

Then, referring to FIGS. 10 and 11, a gas insulated electrical apparatus 1 according to the third embodiment will be hereinafter described. Gas insulated electrical apparatus 1 according to the third embodiment is basically similar in configuration to gas insulated electrical apparatus 1 according to the first embodiment, but is different therefrom in that it further includes a disconnector 10, and also different in that a third dielectric film 16 is formed on a surface of each of second electric field relaxing shield 14 and third electric field relaxing shield 15 in disconnector 10, the surface being exposed inside container 2.

Disconnector 10 includes a fixed-side electrode 11; a movable-side electrode 12 located at a distance from fixed-side electrode 11; and a movable conductor 13 connected to movable-side electrode 12 and provided in fixed-side electrode 11 in an attachable/detachable manner. Fixed-side electrode 11, movable-side electrode 12 and movable conductor 13 each may have any configuration, in which case each may have a configuration similar to that of the conventional gas insulated electrical apparatus. In addition, gas insulated electrical apparatus 1 according to the first embodiment includes a plurality of high voltage conductors 3, one of which has a conductor portion connected to fixed-side electrode 11 and another of which has a conductor portion connected to movable-side electrode 12.

Fixed-side electrode 11 is provided with a nail-shaped contact portion 17. Nail-shaped contact portion 17 is provided such that it can be pressed against the outer circumferential surface of movable conductor 13 with prescribed force. Fixed-side electrode 11 and movable conductor 13 are electrically connected in such a manner that nail-shaped contact portion 17 comes in contact with the outer circumferential surface of movable conductor 13 so as to hold movable conductor 13 thereby.

In disconnector 10, second electric field relaxing shield 14 and third electric field relaxing shield 15 are formed around fixed-side electrode 11 and movable-side electrode 12, respectively, in order to reduce a potential gradient. Second electric field relaxing shield 14 is formed so as to surround a portion exposed inside container 2 at a connection portion formed by connecting movable conductor 13 and fixed-side electrode 11. In other words, second electric field relaxing shield 14 is formed so as to surround nail-shaped contact portion 17.

Similarly, third electric field relaxing shield 15 is provided so as to surround a portion exposed inside container 2 at a connection portion between movable conductor 13 and movable-side electrode 12. Second electric field relaxing shield 14 is electrically connected to fixed-side electrode 11. Third electric field relaxing shield 15 is electrically connected to movable-side electrode 12. Second electric field relaxing shield 14 and third electric field relaxing shield 15 each can be made of any material having conductivity, which may be Al or an aluminum alloy, for example.

Third dielectric film 16 is formed on a surface of each of second electric field relaxing shield 14 and third electric field relaxing shield 15 that is exposed inside container 2. Third dielectric film 16 includes: a fifth main surface 16A exposed inside container 2; and a sixth main surface 16B located on the side opposite to fifth main surface 16A and being in contact with second electric field relaxing shield 14 or third electric field relaxing shield 15. Third dielectric film 16 may be made of any material having an electrical insulation property and heat resistance, which may be aluminum oxide, for example. Specifically, third dielectric film 16 is made of alumite formed, for example, by anodizing second electric field relaxing shield 14 or third electric field relaxing shield 15 that is made of aluminum.

Third dielectric film 16 is provided with a third through hole 16H extending from fifth main surface 16A to sixth main surface 16B. Also, a third coating film 18 is formed on an inner circumferential surface 16C of third through hole 16H such that at least a hole diameter H5 of third through hole 16H is less than a diameter W of the electron avalanche in the state where gas insulated electrical apparatus 1 is used. Specifically with regard to third coating film 18, third through hole 16H may be sealed by third coating film 18 similarly to first coating film 7 and second coating film 9 in the first embodiment. Also, similarly to first coating film 7 and second coating film 9 in the second embodiment, third coating film 18 may be formed such that the distance between which the opposed planes of third coating film 18 formed on inner circumferential surface 16C of third through hole 16H face each other is less than diameter W of the electron avalanche.

Third coating film 18 may be made of any material having an electrical insulation property and also having heat resistance, which may be a hydrate of aluminum oxide, for example. Specifically, third coating film 18 is made of a hydrate of aluminum oxide formed by performing an optional sealing treatment for second electric field relaxing shield 14 and third electric field relaxing shield 15, each of which is made of alumite. Third coating film 18 is less in thickness, for example, than third dielectric film 16.

During the interrupting operation of disconnector 10, a high temperature arc is generated between fixed-side electrode 11 and movable conductor 13. This arc may reach the surface of second electric field relaxing shield 14 or third electric field relaxing shield 15. In this case, minute projections may be formed on the surface of second electric field relaxing shield 14 or third electric field relaxing shield 15, so that the withstand voltage of disconnector 10 may decrease.

In contrast, in gas insulated electrical apparatus 1 according to the third embodiment, at least one of third dielectric film 16 and third coating film 18 each having an electrical insulation property and heat resistance is formed on the surface of each of second electric field relaxing shield 14 and third electric field relaxing shield 15. Accordingly, the surfaces of second electric field relaxing shield 14 and third electric field relaxing shield 15 are not damaged by an arc. Therefore, it becomes possible to achieve a disconnector that can be improved in withstand voltage performance and enhanced in insulation reliability as compared with a conventional disconnector.

In addition, in gas insulated electrical apparatus 1 according to the third embodiment, third coating film 18 may have the same configuration as that of first coating film 7 in gas insulated electrical apparatus 1 according to the second embodiment. Also in this way, the same effects as those achieved by gas insulated electrical apparatus 1 according to the third embodiment can be achieved.

Figure 12:
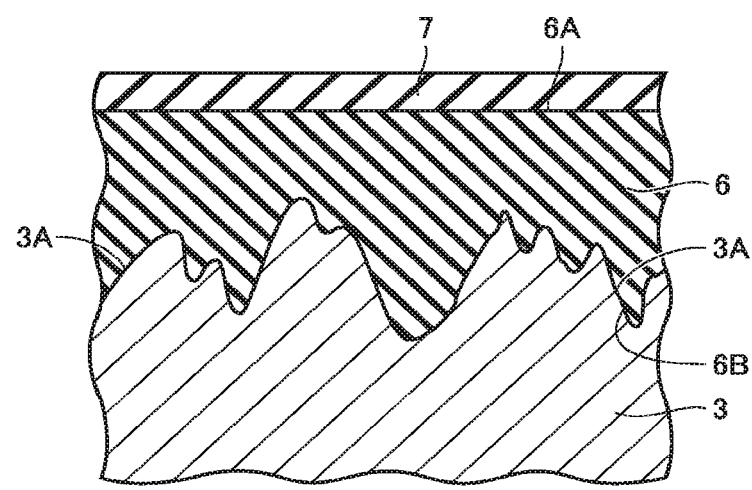
FIG. 12 is a diagram for illustrating a modification of the gas insulated electrical apparatus according to each of the first to third embodiments.

Referring to FIG. 12, high voltage conductor 3 according to each of the first to third embodiments may have a surface 3A provided with projections and depressions. In this case, first dielectric film 6 is formed such that the position of the top portion of each projected portion in a projection/depression region on surface 3A is located on the inner side of high voltage conductor 3 relative to first main surface 6A of first dielectric film 6. In other words, the position of the top portion of each projected portion in the projection/depression region on surface 3A does not project from first main surface 6A to the outside of high voltage conductor 3. In this case, for example, in gas insulated electrical apparatus 1 according to the first embodiment, even if the projected portion is located at a position inside first through hole 6H, first coating film 7 is formed on inner circumferential surface 6C located on the outer side of high voltage conductor 3 relative to this position such that hole diameter H2 of first through hole 6H is less than diameter W of the electron avalanche. Therefore, high insulation reliability can be achieved. Also, in gas insulated electrical apparatus 1 according to the second embodiment, even if the projected portion is located at a position inside first through hole 6H, first through hole 6H is sealed by first coating film 7, so that this projected portion is also sealed by first coating film 7. Therefore, high insulation reliability can be achieved.

Similarly, each of the surfaces of electric field relaxing shield 5, second electric field relaxing shield 14, and third electric field relaxing shield 15 may have projections and depressions. In this case, second dielectric film 8 is formed such that the position of the top portion of each projected portion in the projection/depression region on surface 5A of electric field relaxing shield 5 is located close to electric field relaxing shield 5 relative to third main surface 8A of second dielectric film 8. In other words, the position of the top portion of each projected portion in the projection/depression region on surface 5A does not project from third main surface 8A to the outside of electric field relaxing shield 5. Furthermore, third dielectric film 16 is formed such that the position of the top portion of each projected portion in the projection/depression region of surface 14A of second electric field relaxing shield 14 or surface 15A of third electric field relaxing shield 15 is located close to second electric field relaxing shield 14 or third electric field relaxing shield 15 relative to fifth main surface 16A of third dielectric film 16. In other words, the position of the top portion of each projected portion in the projection/depression region of each of surfaces 14A and 15A does not project from fifth main surface 16A to the outside of second electric field relaxing shield 14 or third electric field relaxing shield 15. In this way, in gas insulated electrical apparatus 1 according to each of the first to third embodiments, even if high voltage conductor 3, electric field relaxing shield 5, second electric field relaxing shield 14, and third electric field relaxing shield 15 each have a considerably rough surface, such a surface is covered by at least one of first dielectric film 6, second dielectric film 8, third dielectric film 16, first coating film 7, second coating film 9, and third coating film 18, with the result that high insulation reliability can be achieved.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present invention is particularly advantageously applicable to a gas insulated electrical apparatus in which a conductor portion applied with a high voltage is covered by a dielectric film provided with a through hole.

REFERENCE SIGNS LIST 1 gas insulated electrical apparatus, 2 container, 3 high voltage conductor, 3A, 5A, 14A, 15A surface, 4 insulating support member, 5 electric field relaxing shield, 6 first dielectric film, 6A first main surface, 6B second main surface, 6H first through hole, 6C inner circumferential surface, 7 first coating film, 8 second dielectric film, 8A third main surface, 8B fourth main surface, 8H second through hole, 8C inner circumferential surface, 9 second coating film, 10 disconnector, 11 fixed-side electrode, 12 movable-side electrode, 13 movable conductor, 14 second electric field relaxing shield, 15 third electric field relaxing shield, 16 third dielectric film, 16A fifth main surface, 16B sixth main surface, 16H third through hole, 16C inner circumferential surface, 17 nail-shaped contact portion, 18 third coating film.

The invention claimed is:

1. A gas insulated electrical apparatus comprising:
a container filled with insulating gas;
a high voltage conductor arranged inside the container and applied with a prescribed voltage; and
an insulating support member configured to insulate and support the high voltage conductor relative to the container, the insulating support member including electrical, thermal, or shock insulation,
the high voltage conductor being covered by a first dielectric film,
the first dielectric film having a first main surface exposed inside the container, and a second main surface located on a side opposite to the first main surface and being in contact with the high voltage conductor,
the first dielectric film being provided with a first through hole extending from the first main surface to the second main surface, and
the first through hole having an inner circumferential surface on which a first coating film is formed such that at least a hole diameter of the first through hole is less than a diameter of an electron avalanche in a state where the gas insulated electrical apparatus is used.

2. The gas insulated electrical apparatus according to claim 1, wherein the first through hole is sealed by the first coating film.

3. The gas insulated electrical apparatus according to claim 1, wherein
the high voltage conductor has a surface including a projection/depression region, and
the projection/depression region includes a projected portion having a top portion that is located on an inner side of the first main surface of the first dielectric film.

4. The gas insulated electrical apparatus according to claim 1, further comprising a first electric field relaxing shield that is provided around the high voltage conductor and that is capable of relaxing an electric field around the high voltage conductor, wherein
a second dielectric film is formed on a surface of the first electric field relaxing shield, the surface being located on a side away from the high voltage conductor and being exposed inside the container,
the second dielectric film includes a third main surface exposed inside the container, and a fourth main surface located on a side opposite to the third main surface and being in contact with the first electric field relaxing shield,
the second dielectric film is provided with a second through hole extending from the third main surface to the fourth main surface, and
the second through hole has an inner circumferential surface on which a second coating film is formed such that at least a hole diameter of the second through hole is less than the diameter of the electron avalanche.

5. The gas insulated electrical apparatus according to claim 1, wherein
the high voltage conductor includes a plurality of conductive portions,
the gas insulated electrical apparatus further comprises:
a disconnector electrically connected to the plurality of conductive portions,
the disconnector includes a fixed-side electrode, a movable-side electrode spaced apart from the fixed-side electrode, and a movable conductor connected to the movable-side electrode and provided in the fixed-side electrode in an attachable/detachable manner,
the disconnector further includes
a second electric field relaxing shield provided so as to surround a portion exposed inside the container at a connection portion formed by connecting the movable conductor and the fixed-side electrode, and
a third electric field relaxing shield provided so as to surround a portion exposed inside the container at a connection portion between the movable conductor and the movable-side electrode,
a third dielectric film is formed on a surface of each of the second electric field relaxing shield and the third electric field relaxing shield, the surface being exposed inside the container,
the third dielectric film includes a fifth main surface exposed inside the container, and a sixth main surface located on a side opposite to the fifth main surface and being in contact with the second electric field relaxing shield or the third electric field relaxing shield,
the third dielectric film is provided with a third through hole extending from the fifth main surface to the sixth main surface, and
the third through hole has an inner circumferential surface on which a third coating film is formed such that at least a hole diameter of the third through hole is less than the diameter of the electron avalanche.

6. The gas insulated electrical apparatus according to claim 1, wherein the high voltage conductor is made of a material including aluminum, the first dielectric film is made of a material including alumite, and the first coating film is made of a material including an aluminum oxide hydrate.

7. A method of manufacturing a gas insulated electrical apparatus, the method comprising:

preparing a container filled with insulating gas, a high voltage conductor located inside the container and applied with a prescribed voltage, and an insulating support member configured to insulate and support the high voltage conductor relative to the container, the insulating support member including electrical, thermal, or shock insulation; and covering the high voltage conductor by a first dielectric film, the first dielectric film including a first main surface exposed inside the container, and a second main surface located on a side opposite to the first main surface and being in contact with the high voltage conductor, and the first dielectric film being provided with a first through hole extending from the first main surface to the second main surface, the method further comprising:

forming a first coating film on an inner circumferential surface of the first through hole such that at least a hole diameter of the first through hole is less than a diameter of an electron avalanche.

8. The method of manufacturing a gas insulated electrical apparatus according to claim 7, wherein the forming a first coating film includes covering the first through hole by the first coating film.

9. The method of manufacturing a gas insulated electrical apparatus according to claim 7, wherein the forming a first coating film includes performing a hydration treatment under a pressurized steam atmosphere for the high voltage conductor having the first dielectric film formed thereon, thereby forming the first coating film.

10. The method of manufacturing a gas insulated electrical apparatus according to claim 7, wherein the high voltage conductor is made of a material including aluminum, the first dielectric film is made of a material including alumite, and the first coating film is made of a material including an aluminum oxide hydrate.

* * * * *